Oct. 27, 1936.  E. P. MARLMAN  2,059,127
DEVICE FOR KILLING FUR BEARING ANIMALS
Filed Dec. 29, 1934
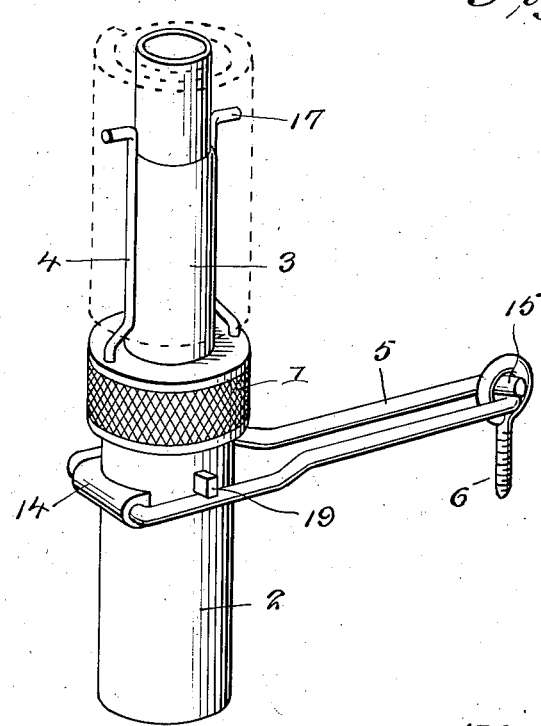
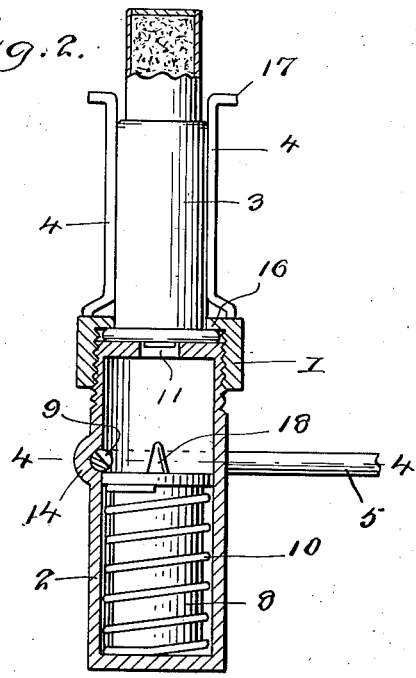
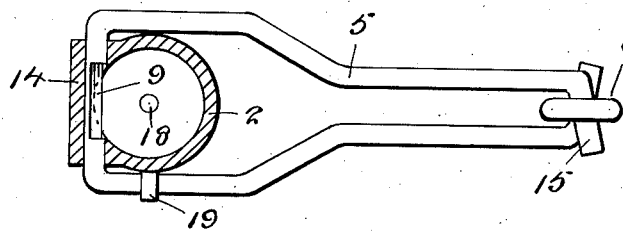
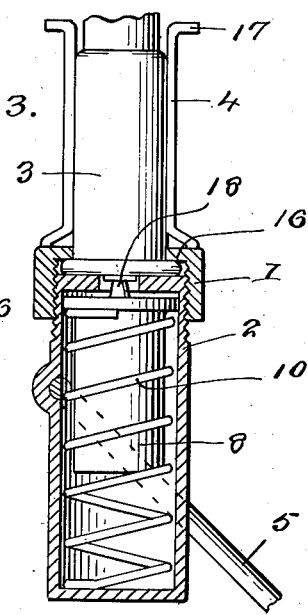
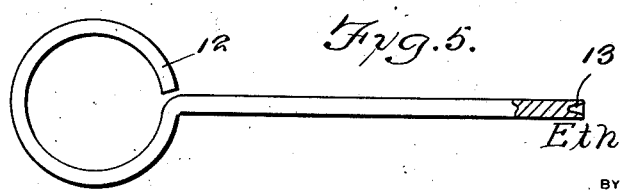
Ethel P. Marlman, INVENTOR
BY Victor J. Evans & Co.
ATTORNEY Patented Oct. 27, 1936

2,059,127

UNITED STATES PATENT OFFICE 2,059,127

DEVICE FOR KILLING FUR-BEARING ANIMALS

Ethel P. Marlman, Las Animas, Colo.

Application December 29, 1934, Serial No. 759,625

4 Claims. (Cl. 43—84)

This invention has been devised to provide a means for automatically killing or rendering unconscious fur-bearing animals in a humane manner by ejecting a chemical such as cyanide or other suitable poisonous material, into the mouth of an animal, when it attempts to get the bait set for it; causing the animals to die close to the device.

A further object is that the humane fur getter, when set for a small animal, such as the weasel, will kill any fur bearing animal (including the wolf) that attempts to take the bait; and vice versa.

Another object of the invention is that it will be highly efficient in use and economical in manufacture. A still further object of the invention is that it is small and compact, making it easy for a person to carry a large number of the humane fur getters with ease; and takes very little time to set it for animal.

Another object is that the device can be used in water, on land, snow or on a tree.

The present invention constitutes an improvement over that disclosed in my prior application for United States Letters Patent filed on or about Oct. 12, 1931, Serial No. 568,408.

Other objects reside in the novel details of construction and in novel combinations, and arrangements of parts, which will more fully appear in the course of the following description.

In the drawing, in which like reference characters designate the same parts in the several views, Figure 1 is a perspective view of the chemical killing device made in accordance with the present invention and illustrates the same set and baited.

Figure 2 is a vertical longitudinal sectional view of the device in set position.

Figure 3 is a view similar to Figure 2, except that the device has been sprung or is in unset position.

Figure 4 is a sectional view taken approximately on line 4—4 of Figure 2, with parts including the trigger, shown in elevation.

Figure 5 is a view of the setting or cocking tool.

Referring to the drawing in detail, it will be noted that the device includes a bait and shell holder provided with a serrated collar 1 threaded on a cylindrical barrel 2 closed at its lower end, while its upper end has a small centrally arranged opening therein.

A trigger 5 forms a part of the device and consists of a substantially U-shaped portion having its bight portion pivotally mounted in a boss 14 providing a bearing therefor and which is secured to the barrel with the bore thereof communicating with the interior of the barrel as clearly shown in Figure 4 of the drawing. The bight portion which is notched as at 9 extends within the barrel and the arms of the trigger are disposed on opposite sides of the barrel, and thence merge into parallel extensions that terminate in inwardly bent overlapped ends 15, the use of which will be explained hereinafter.

The collar 1 of the bait and shell holder is flanged to provide a seat 16 for the shell 3 that extends parallel with and between two arms 4, the latter being secured to and rising from the flange, as best shown in Figure 1. The arms 4 have right angularly disposed outwardly bent upper ends providing bait holding prongs 17.

A spring 10 and firing plunger 8 are disposed within the barrel, as shown, and one end of the spring bears against the bottom of the barrel, while its opposite end bears against the overhanging portion of the top of the firing plunger 8 to urge the latter upwardly for causing the firing pin 18 thereof to penetrate and fire the primer 11 which fits in the bottom of the shell 3, for disposal in alignment with the opening in the upper end of the barrel.

The setting tool as shown in Figure 5 is formed from wire and consists of a loop 12 having extending therefrom a shank provided with a concavity 13 in its free end, to fit over the firing pin 18 of the plunger 8 to push the firing plunger down against the action of the spring for disposing the upper end of the plunger in engagement with the bight portion below the notch thereof, as shown in Figure 2, when the trigger is disposed in set position against the abutment lugs 19. The loop 12 provides a handle for the tool, as will be apparent.

In the use of my device, the spring 10 and firing plunger are retracted by the use of the setting tool, and are held in position by the notched portion of the trigger. The shell is then loaded with chemical and inserted through the collar 1 for disposal on its seat. The bait is then put around the shell and arms 4, as clearly shown in Figure 1.

Bait and shell holder is now screwed on barrel 2. The ends 15 of the trigger are snapped in screw eye 6. The device which is now set is anchored on a tree or a stake in the ground by the screw eye in a place where the bait is likely to attract the animal desired to be killed.

When the animal bites the bait and attempts to extricate it, the notch 9 of the trigger 5 is moved which releases the spring 10 and firing plunger 8 which in turn fires the primer 11 and ejects the chemical into the open mouth of the animal, thus killing it in a humane manner.

What I claim and desire to secure by Letters Patent is:

1. A chemical killing device for animals, comprising a barrel, a spring pressed plunger within the barrel, a firing pin carried thereby for passage through the upper end of the barrel, a bait and shell holder detachably secured to the barrel for disposing a shell in the path of the firing pin, a trigger including a substantially U-shaped portion having the arms thereof arranged upon opposite sides of the barrel and its bight portion pivotally secured thereto, means for fixing the device to stationary means and carried by the trigger, and the bight portion being notched with the notched portion within the barrel for disposal into and out of the path of the plunger to hold the latter in set position and to allow passage thereof to firing position.

2. A chemical killing device for animals, comprising a barrel, a spring pressed plunger within the barrel, a firing pin carried thereby for passage through the upper end of the barrel, a bait and shell holder including a collar for detachably securing a shell in the path of the firing pin, spaced parallel arms rising from the collar for disposal upon opposite sides of the shell, and right angularly bent outwardly disposed upper ends for the arms providing bait holding prongs, a trigger pivotally secured to the barrel, and means for fixing the device to stationary means carried by the trigger and the trigger having a portion within the barrel for disposal into and out of the path of the plunger to hold the latter in set position and to allow passage thereof to firing position.

3. A chemical killing device for animals, comprising a barrel, a spring pressed plunger within the barrel and having an overhanging upper end, a firing pin carried by the upper end for passage through the barrel, a bait and shell holder detachably secured to the barrel for disposing a shell in the path of the firing pin, a trigger pivotally secured to the barrel, and means for fixing the device to stationary means carried by the trigger and the trigger having a notched portion within the barrel for disposal into and out of the path of the overhanging upper end of the plunger to hold the latter in set position and to allow passage thereof to firing position.

4. A chemical killing device for animals, comprising a barrel, a spring pressed plunger within the barrel, a firing pin carried thereby for passage through the upper end of the barrel, a bait and shell holder detachably secured to the barrel for disposing a shell in the path of the firing pin, a trigger including a substantially U-shaped portion having its arms arranged upon opposite sides of the barrel and its bight portion pivotally secured thereto, extensions formed on the arms and terminating in overlapped inwardly bent ends, means for holding the ends associated and for fixing the device to stationary means, said bight portion being notched with its notched portion within the barrel for disposal into and out of the path of the plunger to hold the latter in set position and to allow passage thereof to firing position.

ETHEL P. MARLMAN.